United States Patent Office 3,301,857
Patented Jan. 31, 1967

3,301,857
SPIRO[3,4-DIHYDROISOQUINOLINE-1(2H),4'-PIPERIDINES]
Leo Berger, Montclair, Alfred John Corraz, Packanack Lake, and John Lee, Montclair, N.J., assignors to Hoffmann-La Roche Inc., Nutley, N.J., a corporation of New Jersey
No Drawing. Filed Aug. 26, 1963, Ser. No. 304,671
10 Claims. (Cl. 260—288)

The present invention relates to spiro[3,4-dihydroisoquinoline-1(2H),4'-piperidines]. More particularly, the present invention relates to substituted spiro[3,4-dihydroisoquinoline-1(2H),4'-piperidines] and to processes and intermediates for their preparation.

The subsituted spiro[3,4-dihydroisoquinoline-1(2H),4'-piperidines] of the invention have the formula

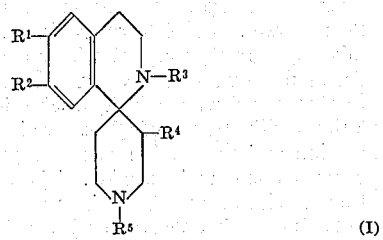

wherein $R^1$ and $R^2$ are —H, —OH, lower alkyl, or lower alkoxy; $R^3$ is —H or lower alkanoyl; $R^4$ is —H or lower alkyl; and $R^5$ is —H, lower alkyl, phenyl-lower alkyl, or dilower-alkylamino-lower alkyl, e.g., diethylaminoethyl; except that when $R^4$ is lower alkyl, $R^1$ must be lower alkoxy.

The invention also relates to acid addition salts of the compounds of Formula I with pharmaceutically acceptable acids.

In the above Formula I the term "lower alkyl," the lower alkyl portion of the term "lower alkoxy," and the term "lower alkanoyl" are to be understood to include lower alkyl groups having from 1 to 7 carbon atoms which can be either straight or branched chain alkyl groups, e.g., methyl, ethyl, propyl, butyl, isobutyl, tertiary butyl, hexyl, heptyl, etc.

The compounds of Formula I and their acid addition salts exhibit blood pressure lowering activity and are useful as hypotensive agents.

The compounds of Formula I are prepared by reacting a substituted phenyl acetamide of the formula

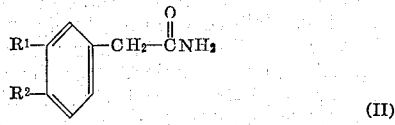

or a nitrile of the formula

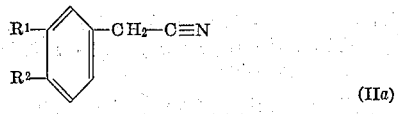

wherein $R^1$ and $R^2$ have the meaning given above with a substituted 4-piperidone of the formula

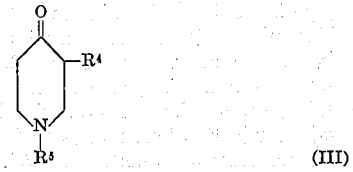

wherein $R^4$ and $R^5$ have the meaning given above in the presence of either sulfuric acid or a mixture of phosphorus pentoxide and ortho-phosphoric acid. A mixture of phosphorus pentoxide and ortho-phosphoric acid is preferred. In general, from about 2.5 to 10, preferably from about 5 to about 6 parts by weight of phosphorus pentoxide, and from about 2.5 to about 10.0, preferably from about 5 to about 6 parts by weight of ortho-phosphoric acid is employed, based on weight of substituted benzamide or benzonitrile used. The phosphoric acid can be anhydrous, but preferably a small quantity of water is present, i.e., up to about 15 percent water, e.g., 85 percent phosphoric acid. The reaction is carried out at a temperature in the range of from about 50° to about 160°, preferably from about 80° to about 110° C. When sulfuric acid is employed, the sulfuric acid can contain from up to about 2 percent water. From about 0.85 to about 1.2 parts by weight of sulfuric acid, based on the weight of substituted benzamide or benzonitrile can be employed. When sulfuric acid is used, an organic solvent, e.g., chloroform, is preferably employed for carrying out the reaction. Other solvents that can be employed include carbon tetrachloride, methylene chloride, benzene, heptane, etc.

In the above reaction scheme when $R^4$ is lower alkyl, $R^1$ must be an electron donating group such as lower alkoxy, hydroxy, lower alkyl, etc., since it has been discovered that when $R^4$ is lower alkyl, the instant cyclization reaction will not otherwise take place.

The compounds of Formula II are prepared in accordance with the methods described in "Organic Syntheses," Coll. vol. IV, pages 760–763 (1963). The compounds of Formula IIa are prepared in accordance with the methods described in "Organic Syntheses," Coll. vol. I, 2nd edition, pages 107–109 (1941).

The compounds of Formula III are prepared in accordance with the methods described in Howton, Journal of Organic Chemistry, vol. 10, pages 277–282 (1945), Ziering et al., Journal of Organic Chemistry, vol. 12, page 901 (1947), Bolyard, et al., J. Am. Chem Soc., vol. 51, pages 922–928, (1929) and Stork et al., J. Am. Chem. Soc., vol. 68, pages 1053–1057 (1946).

The above reaction results in the formation of compounds of the formula

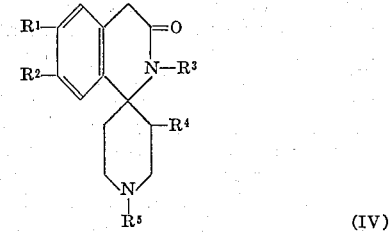

wherein $R^1$ through $R^5$ have the meaning given above.

The compound of Formula IV is isolated from the above reaction mixture, e.g., by neutralizing the reaction mixture with alkali preferably in aqueous solution which precipitates the compound of Formula IV, and then removing this compound from the neutralized aqueous solution, e.g., by filtration.

The compounds of Formula IV are then converted into the products of the invention of Formula I by reduction, e.g., by means of an amide reducing agent, i.e., a reducing agent capable of reducing an amide function to an amine. Suitable reducing agents include Group I metal–Group III metal hydrides, e.g., lithium aluminum hydride, sodium borohydride, etc., preferably in the presence of aluminum chloride. Other amide reducing agents that can be employed include the aluminum hydride tri-lower alkylamine complex, e.g., aluminum hydride trimethylamine complex, etc.

Additionally, compounds of Formula I wherein $R^5$ is hydrogen can be converted to compounds of Formula I wherein R is other than hydrogen by reaction of a compound of Formula I wherein R is hydrogen with a suitable alkylating agent, e.g., a lower alkyl halide, a phenyl-lower alkyl halide, or a dilower alkylamine-lower alkyl halide or the above reaction can be carried out with a compound of Formula IV wherein $R^5$ is hydrogen to prepare a compound of Formula IV wherein $R^5$ is other than hydrogen and then reducing the latter compound by the process given above.

Alternatively, compounds of Formula I wherein $R^1$ and/or $R^2$ are OH can be prepared by hydrolyzing the corresponding lower alkoxy derivative or by hydrolyzing $R^1$ and/or $R^2$ in the intermediates of Formula IV prior to the reduction step.

The invention will be better understood from the following examples which are given for illustration purposes only and are not meant to limit the invention.

*Example 1.—Preparation of 3,4-dihydro-6,7-dimethoxy-1',3' - dimethylspiro[isoquinoline - 1(2H),4' - piperidine]dihydrochloride*

A solution of phosphorus pentoxide in 85 percent phosphoric acid is prepared as follows: 50 g. of phosphorus pentoxide is placed in a 2-liter, 3-necked flask with constant stirring (Teflon blade), and 50 g. of 85 percent phosphoric acid is added with caution. The solution heats up to 200–250° C. spontaneously. When the initial exothermic reaction subsides, the reaction mixture is heated externally (200–250°) with constant stirring until a clear viscous solution is obtained. The solution is then cooled to room temperature with constant stirring. To this thick solution with stirring are added 9.5 g. of 3,4-dimethoxy-phenylacetamide and 9.5 g. of 1,3-dimethylpiperidone-4 and the reaction mixtures heated with stirring at 100° for 10 hours. Water is added and the insoluble matter filtered off and the acidic solution made basic with strong alkali. The base that separates, 6,7-dimethoxy-1',3'-dimethylspiro[isoquinoline - 1(2H),4' - piperidin] - 3(4H)-one, is crystallized from Skellysolve "B" and acetone; M.P. 150–152°.

A small portion of the base is converted to the hydrochloride with alcoholic HCl and the salt obtained is recrystallized from ethyl acetate and methanol; M.P. 267–268° with decomposition.

4.7 g. of aluminum chloride dissolved in 50 ml. of ether is added rapidly to a stirred solution of 1.3 g. of lithium aluminum hydride in 50 ml. of ether. After the complex is stirred at room temperature for 15 minutes, 5 g. of 6,7-dimethoxy - 1',3' - dimethylspiro[isoquinoline - 1(2H),4'-piperidin]-3(4H)-one, suspended in 200 ml. of ether, is added. The reaction mixture is stirred under reflux for 18 hours and then allowed to cool to room temperature. It is further cooled to +3° and decomposed by adding cold water. The reaction mixture is made acid to Congo red and the ether soluble portion discarded. Excess sodium carbonate is carefully added to the aqueous portion (a paste forms) and the mixture is triturated 5 times with 200 ml. of ether each time. The ether solutions are combined and dried over potassium carbonate. After the desiccant is filtered off, the ether is removed on a water bath and the residue distilled under reduced pressure, B.P. of product 142–155° C. at 0.08 mm. The distillate is dissolved in 100 ml. of ether, and hydrogen chloride gas passed into the solution. The precipitate is filtered off and air dried. Following recrystallization from acetone and water, 3,4-dihydro-6,7-dimethoxy-1',3'-dimethylspiro-[isoquinoline-1(2H),4'-piperidine]dihydrochloride is obtained, M.P. 260–262° C.

*Example 2.—Preparation of 3,4-dihydro-1'-methylspiro [isoquinoline-1(2H),4'-piperidine]dihydrochloride*

A solution of 50 g. of phosphorus pentoxide in 50 g. of 85 percent phosphoric acid is prepared according to the process of Example 1. To this thick solution, at room temperature with constant stirring, is added 6.0 g. of phenylacetamide and 6.0 g. of 1-methylpiperidone-4 in that order. The mixture is then heated to 100° and with constant stirring heated at 100° for 10 hours.

On cooling, the reaction mixture is diluted with water and filtered from insoluble matter. The clear acid solution is basified with sodium hydroxide (flakes or 50 percent solution) until alkaline (pH>8.0) with external and internal cooling (ice). The base that is obtained is dissolved in chloroform, the chloroform solution washed with water, dried over anhydrous calcium chloride, filtered from the drying agent and evaporated to dryness. The base, 1'-methylspiro[isoquinoline-1(2H),4'-piperidin]-3(4H)-one hydrochloride is crystallized from Skellysolve "B" and acetone and melts at 171–173°.

11.7 g. of aluminum chloride dissolved in 100 ml. of tetrahydrofuran is added rapidly to a stirred solution of 3.3 g. of lithium aluminum hydride in 50 ml. of tetrahydrofuran. After the complex is stirred at room temperature for 15 minutes, 10 g. of 1'-methylspiro[isoquinoline-1(2H),4'-piperidin]-3(4H)-one dissolved in 200 ml. of tetrahydrofuran is added. Following the addition, the reaction mixture is refluxed and stirred for 27 hours and then allowed to cool to room temperature. The reaction mixture is further cooled with an ice bath to +3° and decomposed with cold water. The mixture is made acid to Congo red with 6 N hydrochloric acid and extracted 3 times with 200 ml. of ether. Ice is added to the aqueous portion and then it is made strongly alkaline with concentrated sodium hydroxide. The caustic mixture is extracted with ether. After the ether solution is dried over potassium carbonate, the desiccant is filtered off and the ether removed on a water bath. The residue is distilled under reduced pressure; B.P. 110–115° C. at 0.18 mm. The base is dissolved in ether and an excess of a solution of hydrogen chloride in alcohol is added. The precipitate is crystallized from a solution of acetone and methanol; M.P. 306–307° C. A small portion was recrystallized from methanol; M.P. 309° C. (uncorrected).

*Example 3.—Preparation of 2 - acetyl - 3,4 - dihydro-1'-methylspiro[isoquinoline - 1(2H),4' - piperidine]hydrochloride*

A solution of 5 g. of 3,4-dihydro-1'-methylspiro[isoquinoline-1(2H),4'-piperidine], prepared in Example 2, 10 ml. of acetic anhydride and 50 ml. of chloroform is refluxed for 7 hours. The volatile components are removed under reduced pressure on a water bath. The residue is dissolved in 200 ml. of water and 20 ml. of 6 N hydrochloric acid. The solution is washed twice with ether and then saturated with potassium carbonate. The product is extracted with ether. The ether solution is dried over sodium sulfate. After the desiccant is filtered off, the ether is removed on a water bath. The residue is crystallized from Skellysolve "B"; M.P. 117–118°. The base is dissolved in ether and hydrogen chloride is passed into the solution. The precipitate, 2-acetyl-3,4-dihydro - 1' - methylspiro[isoquinoline-1(2H),4'-piperidine]hydrochloride, is recrystallized from a solution of ethyl acetate and methanol; M.P. 252–253° (uncorrected).

*Example 4.—Preparation of 3,4-dihydro-6-methoxy-1',3'-dimethylspiro[isoquinoline - 1(2H),4' - piperidine]dihydrochloride*

To a solution of 60 g. of phosphorus pentoxide in 60 g. of 85 percent phosphoric acid is added 14.7 g. of meta-methoxyphenylacetamide and 14.7 g. of 1,3-dimethyl-piperidone-4 and the mixture heated at 100° for 10 hours. The mixture is then diluted with water and filtered from insoluble matter. The acidic solution is made basic with strong alkali. A syrupy base, 6-methoxy-1',3'-dimethyl-spiro[isoquinoline-1(2H),4'-piperidin]-3(4H)-one, is obtained which is hardened with Skellysolve "B" and crystallized from acetone; M.P. 136°.

6 g. of aluminum chloride dissolved in 100 ml. of ether is rapidly added with stirring to a solution of 1.7 g. of lithium aluminum hydride in 25 ml. of ether. After the complex is stirred at room temperature for 20 minutes, 6 g. of 6-methoxy - 1',3' - dimethylspiro[isoquinoline-1(2H),4'-piperidin]-3(4H)-one suspended in 250 ml. of ether is added. Following the addition, the reaction is stirred at reflux temperature for 18 hours and then allowed to cool to room temperature. By means of an ice bath, the reaction mixture is further cooled to +3° and decomposed with cold water. The pH is made less than 1 with 6 N hydrochloric acid and the ether portion of the mixture discarded. The aqueous portion is made strongly alkaline with concentrated sodium hydroxide and the product isolated by extraction with ether. The ether solution is dried over anhydrous sodium sulfate. After the desiccant is removed by filtration, the ether is removed on a water bath and the residue distilled at reduced pressure; B.P. 120–133° C. at 0.08 mm. The distillate is dissolved in ether and a solution of excess alcoholic hydrogen chloride is added. The precipitate, 3,4 - dihydro-6-methoxy-1',3'-dimethylspiro[isoquinoline-1(2H),4'-piperidine]dihydrochloride, is filtered and air dried. Following recrystallization from a solution of ethyl acetate and methanol, the melting point is 228° C.

*Example 5.—Preparation of 3,4-dihydro-1'-phenethyl-spiro[isoquinoline-1(2H),4'piperidine]dihydrochloride*

A mixture of 10 g. of 1'-benzylspiro[isoquinoline-1(2H),4'-piperidin]-3(4H)-one, 1 g. of 10 percent palladium-on-carbon suspended in 20 ml. of water and enough methanol to bring the total volume up to 180 ml. is shaken in a "Parr bomb" under 3.4 atm. of hydrogen. After 3 hours, with the temperature maintained near 95°, slightly more than the theoretical amount of hydrogen is reacted and the reaction is stopped. When the reaction mixture cools to room temperature, the used catalyst is filtered off and the filtrate concentrated under reduced pressure on a water bath. Following crystallization of the residue from ethyl acetate, 4.5 g., M.P. 207–208° (uncorrected), of spiro[isoquinoline-1(2H),4'-piperidin]-3(4H)-one is obtained.

10 g. of phenethylbromide dissolved in 10 ml. of ethanol is added dropwise at room temperature to a stirring solution of 4 g. of spiro[isoquinoline-1(2H),4'-piperidin]-3(4H)-one. Following the halide addition, 20 ml. of 6 N sodium hydroxide are added dropwise with stirring. Following the completion of the last addition, the reaction mixture is stirred at room temperature for 8 hours and then extracted with chloroform. The chloroform solution is washed neutral with water, dried over anhydrous sodium sulfate and concentrated to dryness under vacuum on a water bath. The residue is dissolved in 30 ml. of chloroform and 10 ml. of acetic anhydride is added. The solution is refluxed for 3 hours on a steam bath, and the volatile components removed under reduced pressure on a water bath. The solid residue is partitioned between 200 ml. of ether and 200 ml. of 0.5 N hydrochloric acid. The aqueous portion is separated and extracted once with chloroform. Excess potassium carbonate is then added to the aqueous portion and the aqueous portion extracted with chloroform. The chloroform solution is dried over anhydrous sodium sulfate, and the solution filtered. The filtrate is concentrated on a steam bath to give 3.3 g. of a crystalline solid. Upon trituration of the residue, 1-phenethylspiro[isoquinoline-1(2H),4'-piperidin]-3(4H)-one, with acetone the melting point becomes greater than 250° C.

A solution of 7 g. of aluminum chloride dissolved in 40 ml. of ether is added to a stirred solution of 2 g. of lithium aluminum hydride in 50 ml. of ether. The resulting complex is stirred 10 minutes at room temperature; 3.2 g. of 1 - phenethylspiro[isoquinoline - 1(2H),4' - piperidine]-3(4H)-one suspended in 100 ml. of ether is added with stirring. The mixture is refluxed and stirred for 11 hours and allowed to cool to room temperature. The reaction is further cooled by means of an ice bath to +3°; 20 ml. of ethanol is added cautiously followed by 100 ml. of water. The pH is made less than one with 1 N hydrochloric acid and the ether portion discarded. One kg. of ice is added to the aqueous portion and the mixture is made strongly alkaline with concentrated sodium hydroxide. The product is extracted with ether. After the ether solution is dried over anhydrous sodium sulfate, the desiccant is filtered off and hydrogen chloride gas is passed into the ether solution. The precipitate, 3,4-dihydro-1'-phenethylspiro[isoquinoline - 1(2H),4' - piperidine]dihydrochloride, is filtered and air dried. After recrystallization from a mixture of ethyl acetate and methanol, the melting point is >260° C.

*Example 6.—Preparation of 3,4-dihydro-1'-isobutylspiro-[isoquinoline-1(2H),4'-piperidine]dihydrochloride*

A solution of 70 g. of phosphorus pentoxide in 70 g. of 85 percent phosphoric acid is prepared according to the process of Example 1. To this thick solution is added 6.0 g. of phenylacetonitrile and 10.0 g. of 1-isobutylpiperidone-4 with constant stirring. The reaction mixture is then heated to 100° for 10 hours and poured onto ice water. The insoluble material is separated and the acid solution made basic with sodium hydroxide flakes with cooling. The solid base that separates, 1'-isobutylspiro[isoquinoline-1(2H),4'-piperidine]-3(4H)-one, is collected by filtration and recrystallized from Skellysolve "B"; M.P. 154°.

A small portion of the base is converted to the hydrochloride salt with alcoholic HCl and upon recrystallization from ethyl acetate-methanol the melting point of the salt is 308–323° C. with decomposition.

The above piperidone is reduced and converted to 3,4-dihydro - 1' - isobutylspiro[isoquinoline - 1(2H),4'-piperidine]dihydrochloride according to the process of Example 1.

*Example 7.—Preparation of 1'-benzyl-3,4-dihydrospiro [isoquinoline-1(2H),4'-piperidine]dihydrochloride*

A solution of 70 g. of phosphorus pentoxide in 70 g. of 85 percent phosphoric acid is prepared according to the process of Example 1. To the thick solution, with constant stirring, is added 6.0 g. of phenylacetamide and 10.0 g. of 1-benzyl-piperidone-4 in that order. The mixture is then heated to 100° and kept at 100° for 10 hours. Water is added to the reaction mixture and the insoluble matter filtered off. The acidic solution is made basic with solid NaOH flakes with cooling and the base obtained, 1' - benzylspiro[isoquinoline - 1(2H),4' - piperidine]-3(4H)-one, is crystallized from Skellysolve "B" and acetone and melts at 172–173°. A small portion of the base is converted to the hydrochloride via alcoholic HCl, and the resulting salt melts at 323–325° when recrystallized from alcohol.

The above piperidone is reduced and converted to 1'-benzyl - 3,4 - dihydrospiro[isoquinoline - 1(2H),4' - piperidine]dihydrochloride according to the process of Example 1.

*Example 8.—Preparation of 3,4-dihydro-6,7-dimethoxy-1' - methylspiro[isoquinoline - 1(2H),4' - piperidine] dihydrochloride*

A solution of 50 g. of phosphorus pentoxide in 85 percent phosphoric acid is prepared according to the process of Example 1. 10.0 g. of 3,4-dimethoxyphenylacetamide and 12.0 g. of 1-methylpiperidone-4 hydrochloride are added and the mixture heated to 100° for 10 hours. Water is then added and the insoluble matter removed with a chloroform extraction. The acidic solution is made basic with 50 percent sodium hydroxide and a yellow solid base is obtained. The base, 6,7-dimethoxy-1'-methylspiro [isoquinoline - 1(2H),4' - piperidine]-3(4H) - one, is crystallized from Skellysolve "B" and acetone plus some methanol and melts at 188–191°. A small portion of the base is then dissolved in warm ethanol and converted to the hydrochloride salt with ethanolic HCl. Recrystallized from ethyl acetate and methanol, the hydrochloride melts at 262–264° with decomposition.

The above piperidone is reduced and converted to 3,4-dihydro - 6,7 - dimethoxy - 1' - methyspiro[isoquinoline-1-(2H),4'-piperidine]dihydrochloride according to the process of Example 1.

*Example 9.—Preparation of 1'-sec.butyl-3,4-dihydro-6, 7-dimethoxyspiro-[isoquinoline - 1(2H)4'-piperidine] dihydrochloride*

To a solution of 50 g. of phosphorus pentoxide in 50 g. of 85 percent phosphoric acid are added 10 g. of 3,4-dimethoxyphenylacetamide and 10 g. of 1-sec. butyl-piperidone-4 and the mixture heated at 100° for 10 hours. Water is then added and the insoluble matter filtered off and the acidic solution made basic with strong alkali. The base obtained, 1'-sec.butyl-6,7-dimethoxyspiro[isoquinoline - 1(2H),4' - piperidine]-3(4H)-one, is crystallized from Skellysolve "B" and acetone; M.P. 142–144°.

A small portion of the above base is converted to the hydrochloride salt with ethanolic HCl. The hydrochloride addition salt melt sat 274–276° after recrystallization from methanol.

The above piperidone is reduced and converted to 1'-sec.butyl - 3,4 - dihydro-6,7-dimethoxyspiro[isoquinoline-1(2H),4'-piperidine]dihydrochloride according to the process of Example 1.

*Example 10.—Preparation of 1'-benzyl-3,4-dihydro-6,7-dimethoxyspiro[isoquinoline - 1(2H),4' - piperidine] dihydrochloride*

To a solution of 50 g. of phosphorus pentoxide in 50 g. of 85 percent phosphoric acid prepared according to the process of Example 1 are added 10 g. of 3,4-dimethoxyphenylacetamide and 10 g. of 1-benzylpiperidone-4 and the mixture heated at 100° for 10 hours. Water is then added and the insolubles filtered off and the acidic solution made basic with strong alkali. The basic product obtained, 1'-benzyl - 6,7 - dimethoxyspiro[isoquinoline-1(2H),4'-piperidine]-3(4H)-one, is recrystallized from ethanol; M.P. 183–184° (uncorrected). A small portion of the base is converted to the hydrochloride salt with alcoholic HCl. The hydrochloride salt melts at 268–272° with decomposition after recrystallization from ethanol.

The above piperidone is reduced and converted to 1'-benzyl-3,4-dihydro - 6,7 - dimethoxyspiro[isoquinoline-1 (2H),4'-piperidine]dihydrochloride according to the process of Example 1.

*Example 11.—Preparation of 1'-isobutyl-3,4-dihydro-6, 7-dimethoxylspiro[isoquinoline - 1(2H),4' - piperidine]dihydrochloride*

To a solution of 50 g. of phosphorus pentoxide in 85 percent of phosphoric acid, prepared according to the process of Example 1, are added 10 g. of 3,4-dimethoxyphenylacetamide and 10 g. of 1-isobutylpiperidone-4 and the mixture heated at 100° for 10 hours. Water is then added to the reaction mixture and the insolubles filtered off. The acid solution is made basic with strong caustic and the base that separates, 1'-isobutyl-6,7-dimethylspiro-[isoquinoline-1(2H),4'-piperidine]-3(4H)-one, is crystallized with Skellysolve "B" and acetone; M.P. 175–178°. A small portion of the base is converted to the hydrochloride salt with alcoholic HCl and the salt obtained is recrystallized from ethanol; M.P. 200° with decomposition.

The above piperidone is reduced and converted to 1'-isobutyl-3,4-dihydro - 6,7 - dimethoxyspiro[isoquinoline-1(2H),4'-piperidine]dihydrochloride according to the process of Example 1.

*Example 12.—Preparation of 3'-butyl-3,4-dihydro-6,7-dimethoxy - 1' - methylspiro[isoquinoline-1(2H),4'-piperidine]dihydrochloride*

A solution of 50 g. of phosphorus pentoxide in 50 g. of 85 percent phosphoric acid is prepared according to the process of Example 1, and to this thick solution are added 10 g. of 3,4-dimethoxyphenylacetamide and 10 g. of 3-butyl-1-methylpiperidone-4. The mixture is heated for 10 hours at 100° and then diluted with water and filtered. The insolubles are discarded and the acidic solution made basic with strong alkali. The base, 3'-butyl-6,7-dimethoxy - 1' - methylspiro[isoquinoline-1(2H),4'-piperidine]-3(4H)-one, is obtained as a thick liquid which soon solidifies and is crystallized from Skellysolve "B" and acetone; M.P. 102.5° C. A small portion of the base is converted to the hydrochloride salt with alcoholic HCl, M.P. 255–260° C. with decomposition after recrystallization from ethanol.

The above piperidone is reduced and converted to 3'-butyl-3,4-dihydro - 6,7 - dimethoxy-1'-methylspiro[isoquinoline-1(2H),4'-piperidine]dihydrochloride according to the process of Example 1.

*Example 13.—Preparation of 3,4-dihydro-6-hydroxy-1', 3'-dimethylspiro[isoquinoline - 1(2H),4' - piperidine] dihydrochloride*

5.0 g. of 6-methoxy-1',3'-dimethylspiro[isoquinoline-1(2H),4'-piperidine]-3(4H)-one is dissolved in 50 cc. of glacial acetic acid and 20 cc. of 48 percent HBr solution is added. The mixture is refluxed for 4 hours and concentrated to dryness in vacuo. A grayish solid remains that is crystallized from methanol to give 6-hydroxy - 1',3' - dimethylspiro[isoquinoline-1(2H),4'-piperidene]-3(4H)-one– M.P. 236–239°.

The above piperidone is reduced and converted to 3,4-dihydro-6-hydroxy - 1',3' - dimethylspiro[isoquinoline-1(2H),4'-piperidine]dihydrochloride according to the process of Example 1.

*Example 14.—Preparation of 3,4-dihydro-6,7-dimethoxyspiro[isoquinoline - 1(2H),4' - piperidine]dihydrochloride*

A solution of 5.0 g. of 1'-benzyl-6,7-dimethoxyspiro-[isoquinoline-1(2H),4'-piperidine]-3(4H)-one in 180 ml. of ethanol is shaken with 0.5 g. of 10 percent palladium on carbon powder under 3.4 atm. of hydrogen for 3 hours between 80–90°. When slightly more than the theoretical amount of hydrogen is absorbed, the reaction mixture is allowed to cool to room temperature. The catalyst is filtered off and the filtrate concentrated under reduced pressure. The residue, 6,7-dimethoxyspiro-[isoquinoline-1(2H),4'-piperidine]-3(4H)-one, is crystallized from ethanol; M.P. 248–248.5°. A small portion of the crystalline base is dissolved in warm ethanol and an excess of alcoholic hydrogen chloride added. Upon cooling several hours in an ice bath, the precipitate is filtered and air dried to give 2.9 g. of the salt. Following recrystallization from a mixture of ethyl acetate and methanol, the salt melts at 311–312° C.

The above piperidone is reduced and converted to 3,4-dihydro - 6,7 - dimethoxyspiro[isoquinoline-1(2H),4'-piperidine]dihydrochloride according to the process of Example 1.

*Example 15.—Preparation of 1'-(2-diethylaminoethyl)-3,4 - dihydro - 6,7-dimethoxyspiro[isoquinoline-1(2H), 4'-piperidine]dihydrochloride*

10 g. of diethylaminoethyl chloride is added dropwise at room temperature to a stirred solution of 5.6 g. of 6,7-dimethoxyspiro[isoquinoline - 1(2H),4' - piperidine]-3(4H)-one dissolved in a mixture of 50 ml. of ethanol and 50 ml. of water. There is a slight temperature rise during the addition. Following the halide addition, 25 ml. of 6 N sodium hydroxide is added dropwise with stirring. Again there was a slight temperature rise with no external heating. Following the completion of the last addition, the reaction mixture is stirred at room temperature for 5 hours and then extracted with chloroform. The chloroform solution is washed until neutral with water, dried over sodium sulfate and then concentrated to dryness under vacuum on a water bath. The residue is dissolved in 30 ml. of chloroform and 10 ml. of acetic anhydride added. After the solution had refluxed 3 hours on a steam bath, the volatile components are removed under vacuum on a water bath. The residue is dissolved in 200 ml. of 0.5 N hydrochloric acid and the acid solution extracted twice with 100 ml. of chloroform each time. Excess potassium carbonate is added to the aqueous portion and extracted with chloroform. After the chloroform solution is dried over potassium carbonate, the solution is filtered and the filtrate concentrated on a steam bath. The residue is 1'-(2-diethylaminoethyl)-6,7-dimethoxyspiro[isoquinoline - 1(2H),4' - piperidine]-3(4H)-one. A small portion is dissolved in acetone and an excess of an acetone solution of maleic acid is added. Several volumes of ether are added and the precipitate is filtered and air-dried. Following recrystallization from ethanol, the dimaleate salt is obtained; M.P. 152–154° C. Upon recrystallization 3 times from ethanol, the M.P. is 157–158° C.

The above piperidone is reduced and converted to 1'-(2-diethylaminoethyl)-3,4 - dihydro - 6,7 - dimethoxyspiro[isoquinoline - 1(2H),4'-piperidine]dihydrochloride according to the process of Example 1.

We claim:
1. A compound selected from the group consisting of
   (a) a compound of the formula

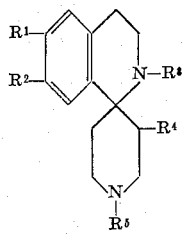

wherein R¹ and R² are selected from the group consisting of hydrogen, hydroxyl, and lower alkoxy; R³ is selected from the group consisting of hydrogen and acetyl; R₄ is selected from the group consisting of hydrogen and lower alkyl; and R⁵ is selected from the group consisting of hydrogen, lower alkyl, phenyl-lower alkyl, and dilower alkylamine-lower alkyl; except that when R⁴ is lower alkyl, R¹ must be lower alkoxy, and
   (b) an acid addition salt thereof with pharmaceutically acceptable acids.

2. A member selected from the group consisting of 3,4 - dihydro-6,7-dimethoxy-1',3'-dimethylspiro[isoquinoline-1(2H),4'-piperidine] and acid addition salts thereof with pharmaceutically acceptable acids.

3. A member selected from the group consisting of 3,4-dihydro-1'-methylspiro[isoquinoline-1(2H),4' - piperidine] and acid addition salts thereof with pharmaceutically acceptable acids.

4. A member selected from the group consisting of 2 - acetyl - 3,4 - dihydro - 1' - methylspiro[isoquinoline-1(2H),4'-piperidine] and acid addition salts thereof with pharmaceutically acceptable acids.

5. A member selected from the group consisting of 3,4 - dihydro - 6 - methoxy - 1',3' - dimethylspiro[isoquinoline-1(2H),4'-piperidine] and acid addition salts thereof with pharmaceutically acceptable acids.

6. A member selected from the group consisting of 3,4 - dihydro - 1' - phenethylspiro[isoquinoline-1(2H),4'-piperidine] and acid addition salts thereof with pharmaceutically acceptable acids.

7. A compound selected from the group consisting of
   (a) a compound of the formula

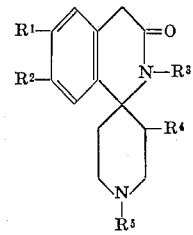

wherein R¹ and R² are selected from the group consisting of hydrogen, hydroxyl, and lower alkoxy; R³ is selected from the group consisting of hydrogen and acetyl; R⁴ is selected from the group consisting of hydrogen and lower alkyl; and R⁵ is selected from the group consisting of hydrogen, lower alkyl, phenyl-lower alkyl, and dilower alkylamine-lower alkyl; except that when R⁴ is lower alkyl, R¹ must be lower alkoxy, and
   (b) an acid addition salt thereof with pharmaceutically acceptable acids.

8. 6 - hydroxy - 1',3' - dimethylspiro[isoquinoline-1(2H),4'-piperidine]-3(4H)-one and acid addition salts thereof with pharmaceutically acceptable acids.

9. A member selected from the group consisting of 1' - (2 - diethylaminoethyl) - 6,7 - dimethoxyspiro[isoquinoline-1(2H),4'-piperidine]-3(4H)-one and acid addition salts thereof with pharmaceutically acceptable acids.

10. 6,7 - dimethoxy - 1',3'-dimethylspiro[isoquinoline-1(2H),4'piperidine]-(4H)-one.

References Cited by the Examiner

UNITED STATES PATENTS 3,040,048   6/1962   Godefroi _____ 260—286

OTHER REFERENCES

Chiaverelli et al.: Chem. Abstr., vol. 55, col. 13427f (1961).

Crundweel: J. Chem. Soc. (London), 1962, 3834–5, QD1C6.

Kagi et al.: Chem. Abs., vol. 44, cols. 4907–9 (1949).

ALEX MAZEL, *Primary Examiner.*

HENRY R. JILES, *Examiner.*

D. G. DAUS, *Assistant Examiner.*